United States Patent
Berger et al.

(10) Patent No.: US 11,767,815 B2
(45) Date of Patent: Sep. 26, 2023

(54) ACTIVATION OF MULTIPLE GAS NEEDLES USING A 3/2 PILOT VALVE

(71) Applicant: Woodward L'Orange GmbH, Stuttgart (DE)

(72) Inventors: Ingmar Berger, Stuttgart (DE); Michael Nitsche, Schwieberdingen (DE); Heinrich Nowak, Ludwigsburg (DE); Steffen Siebert, Schönaich (DE); Andre Kindsvater, Stuttgart (DE); Enrico Bärow, Stuttgart (DE)

(73) Assignee: Woodward L'Orange GmbH

( * ) Notice: Subject to any disclaimer, the term of this patent is extended or adjusted under 35 U.S.C. 154(b) by 25 days.

(21) Appl. No.: 17/310,201

(22) PCT Filed: Jan. 29, 2020

(86) PCT No.: PCT/EP2020/052101
§ 371 (c)(1),
(2) Date: Jul. 26, 2021

(87) PCT Pub. No.: WO2020/164908
PCT Pub. Date: Aug. 20, 2020

(65) Prior Publication Data
US 2022/0205418 A1 Jun. 30, 2022

(30) Foreign Application Priority Data
Feb. 12, 2019 (DE) .......................... 102019103428.0

(51) Int. Cl.
*F02M 43/04* (2006.01)
*F02M 21/02* (2006.01)
(Continued)

(52) U.S. Cl.
CPC .......... *F02M 43/04* (2013.01); *F02M 21/023* (2013.01); *F02M 21/0251* (2013.01);
(Continued)

(58) Field of Classification Search
CPC .. F02M 43/04; F02M 21/023; F02M 21/0251; F02M 21/0263; F02M 21/0275;
(Continued)

(56) References Cited

U.S. PATENT DOCUMENTS

| 9,856,838 | B2 * | 1/2018 | Kalenborn | ............. F02M 61/14 |
| 9,903,325 | B2 * | 2/2018 | Kalenborn | ............. F02M 43/04 |

(Continued)

FOREIGN PATENT DOCUMENTS

| CN | 102953884 | 3/2013 |
| CN | 104040161 | 9/2014 |

(Continued)

OTHER PUBLICATIONS

PCT International Search Report and Written Opinion in International Appln. No. PCT/EP2020/052101, dated Apr. 21, 2021, 12 pages.

(Continued)

*Primary Examiner* — Hai H Huynh
(74) *Attorney, Agent, or Firm* — Fish & Richardson P.C.

(57) ABSTRACT

The invention relates to a fuel injector (1) for operating with combustible gas. The fuel injector has a plurality of combustible-gas nozzle valve elements (9), and the stroke of each of the combustible-gas nozzle valve elements can be controlled by means of a paired hydraulic piston control assembly (55) of the fuel injector, wherein each piston control assembly is formed by two control chambers (59, 61) and a piston section (63) on the combustible-gas nozzle valve element paired with the piston control assembly, said piston section separating the control chambers in such a way that their volumes can be varied, and the fuel injector is designed to control the stroke of the combustible-gas nozzle valve elements in tandem using a 3/2-way valve (67), by means of which the hydraulic pressure in one of the two (Continued)

control chambers of the piston control assemblies is controlled.

16 Claims, 4 Drawing Sheets

(51) Int. Cl.
*F02M 47/04* (2006.01)
*F02M 61/18* (2006.01)
*F02M 63/00* (2006.01)

(52) U.S. Cl.
CPC ...... *F02M 21/0263* (2013.01); *F02M 47/043* (2013.01); *F02M 47/046* (2013.01); *F02M 61/18* (2013.01); *F02M 63/0045* (2013.01); *F02M 2200/44* (2013.01)

(58) Field of Classification Search
CPC ............. F02M 21/0284; F02M 21/026; F02M 47/043; F02M 47/046; F02M 61/18; F02M 63/0045; F02M 2200/44; F02M 55/008; F02D 19/0657; F02D 19/0692; F02D 19/0694; F02D 19/10; Y02T 10/30
USPC .............................. 123/525; 239/533.12, 584
See application file for complete search history.

(56) References Cited

U.S. PATENT DOCUMENTS

| | | | |
|---|---|---|---|
| 10,082,108 B2 * | 9/2018 | Berger | ............... F02M 21/0284 |
| 10,598,102 B2 * | 3/2020 | Boog | ...................... F02D 19/10 |
| 2001/0007338 A1 | 7/2001 | Popp | |
| 2016/0319754 A1 * | 11/2016 | Kalenborn | .......... F02D 19/0694 |

FOREIGN PATENT DOCUMENTS

| | | |
|---|---|---|
| CN | 105849394 | 8/2016 |
| CN | 105874188 | 8/2016 |
| DE | 19716221 | 10/1998 |
| DE | 102005058079 | 6/2007 |
| DE | 102013022260 | 5/2015 |
| DE | 102016000894 | 12/2016 |
| DE | 102016002228 | 8/2017 |

OTHER PUBLICATIONS

PCT International Preliminary Report on Patentability in International Appln. No. PCT/EP2020/052101, dated Aug. 26, 2021, 6 pages.
Office Action in Chinese Application No. 2020800133878, dated Dec. 1, 2022, 14 pages (with English Translation).
Office Action in German Application No. DE 10 2019 103 428.0, dated Nov. 5, 2019, 12 pages (with English Translation).

* cited by examiner

A fuel injector is provided, for example, for pilot injection operation in which the combustible gas is ignited by means of injecting a small quantity of liquid fuel (pilot injection). In general, the fuel injector is preferably part of a common rail fuel injection device.

ACTIVATION OF MULTIPLE GAS NEEDLES USING A 3/2 PILOT VALVE

CROSS-REFERENCE TO RELATED APPLICATION(S)

This application is a U.S. National Phase Application under 35 U.S.C. § 371 and claims the benefit of priority to International Application Serial No. PCT/EP2020/052101, filed Jan. 29, 2020, which claims priority to German Application Serial No. 102019103428.0, filed Feb. 12, 2019, the contents of which are hereby incorporated by reference.

The present invention relates to a fuel injector according to claim 1.

A dual-fuel fuel injector is known from DE 10 2013 022 260 B3, said dual-fuel fuel injector being provided for operation with liquid fuel and combustible gas and in which both the liquid-fuel nozzle needle and the combustible-gas nozzle needles are hydraulically controlled via the liquid fuel, in particular with its system pressure level. As a result of the relief of a control chamber above the respective combustible-gas nozzle needle, a force created by the combustible gas pressure predominates on the pressure stage of the combustible-gas nozzle needle and urges it in the opening direction. The control medium must therefore be displaced from the control chamber by means of the force created by the combustible gas pressure, and the respective combustible-gas nozzle needle must also be accelerated. In the case of injectors based on this principle, however, it is possible that with a slightly lower pressure level and only low pressures of the injection medium, for example with combustible gas with a pressure level of approx. 350 bar, the combustible-gas nozzle needle will open too slowly, so that the use of such a fuel injector may not be possible with a fast-running engine.

A fuel injector is known from DE 10 2016 002 228 A1, which is designed to control the stroke of the combustible-gas nozzle valve elements in tandem using a 4/2-way valve. The pressure conditions on a piston connected to the needle are switched using the 4/2-way valve. However, it is not possible to integrate injectors according to this principle into the installation space of smaller engines. Furthermore, in the case of injectors based on this principle, it is possible that at very low pressures at which the combustible-gas nozzle needle of a fuel injector with a 3/2-way valve according to the present invention opens sufficiently quickly, the nozzle needle will open too slowly.

Based on this, it is the object of the present invention to provide a fuel injector in which a plurality of combustible-gas nozzle valve elements, in particular in the form of combustible-gas nozzle needles, are hydraulically controlled at the intended stroke speed, in particular reliably or robustly and yet in an uncomplicated manner, and which can be integrated into the installation space of smaller motors in particular.

This object is achieved with a fuel injector having the features of claim 1.

Advantageous developments and embodiments of the invention are specified in the further claims.

According to the invention, a fuel injector is proposed for operating with gaseous fuel or combustible gas, for example in the form of natural gas, special gas, landfill gas, biogas, hydrogen or similar. The fuel injector can be a single fuel injector, which is only provided for injecting combustible gas, alternatively and preferably a dual-fuel fuel injector which, in addition to combustible gas, can also inject liquid fuel, for example diesel fuel, heavy fuel oil or bio oil. Such a fuel injector is provided, for example, for pilot injection operation in which the combustible gas is ignited by means of injecting a small quantity of liquid fuel (pilot injection). In general, the fuel injector is preferably part of a common rail fuel injection device.

In general, the fuel injector can be used, for example, with a small engine, for example in a motor vehicle such as a truck, an automobile, a special vehicle or a commercial vehicle, or for example provided for a stationary device, e.g. for an (emergency) generator, e.g. also for industrial applications.

The proposed fuel injector has a plurality of combustible-gas nozzle valve elements, each combustible-gas nozzle valve element being provided in particular as a combustible-gas nozzle needle. The combustible-gas nozzle valve elements are arranged on the fuel injector, preferably in a nozzle body thereof, and preferably in an arrangement in which the combustible-gas nozzle valve elements are arranged distributed in the circumferential direction of the nozzle body or the fuel injector. In configurations with three combustible-gas nozzle valve elements, these have, for example, an offset of 120° to one another in the circumferential direction. In addition, configurations are also conceivable which have two, four or more combustible-gas nozzle valve elements, e.g. with an offset of 180° or 90° or a different offset. With such configurations according to the invention having a plurality of combustible-gas nozzle valve elements, the masses of said combustible-gas nozzle valve elements to be moved can advantageously be kept small, so that rapid lifting movements are possible, while at the same time good all-around combustible gas discharge into a combustion chamber by means of the plurality of combustible-gas nozzle valve elements—each of which can interact in a selectively blocking manner with a nozzle or spray hole group of the fuel injector—is made possible, in particular a symmetrical spray pattern.

Advantageously, in the invention, each of the combustible-gas nozzle valve elements can be controlled by means of a paired hydraulic or hydraulically actuated piston control assembly of the fuel injector, wherein each piston control assembly is formed by two control chambers and a piston section on the combustible-gas nozzle valve element paired with the piston control assembly, said piston section separating the control chambers in such a way that their volumes can be varied. One of the control chambers of a respective piston control assembly has the function of being able to exert a closing pressure against the piston section, i.e. the combustible-gas nozzle valve element, when under hydraulic load, while the respective other control chamber has the function of being able to exert an opening pressure against the piston section, and consequently the combustible-gas nozzle valve element, when under hydraulic load. In this regard, the piston control assemblies each have a closing-pressure control chamber and an opening-pressure control chamber.

In the context of such an embodiment, the control chambers are formed, for example, in a (cylindrical) housing of the piston control assembly, in which the piston sections of said piston control assemblies are also received and separated from one another in such a way that their volumes can be varied. The piston control assembly is preferably formed at an end remote from the nozzle of a nozzle body as mentioned above, wherein it is possible for the control chambers and the housing to be provided essentially or exclusively in the nozzle body. The arrangement at the end remote from the nozzle also results in an advantageously simple processing due to unrestricted accessibility in the context of the manufacture of the piston control assembly or the fuel injector.

In preferred embodiments of the invention, within the scope of the control chambers of a respective piston control assembly, a control chamber closer to the nozzle and one more remote from the nozzle are formed (separated from one another by the piston section), i.e. with respect to a nozzle side of the fuel injector. The control chamber closer to the nozzle is in particular the opening-pressure control chamber, and the control chamber more remote from the nozzle is the closing-pressure control chamber. The opening-pressure control chamber is permanently pressurized by a control or barrier oil pressure. Pressurization is permanently achieved by means of a control line. The control line is not connected to the control chambers remote from the nozzle. The pressure source for the control line can also be the control or barrier oil pressure. The control chambers are permanently pressurized jointly via a control line. It is also possible to pressurize the control chambers via, for example, three separate control lines to the same pressure source.

The factors that are decisive for the advantage of saving installation space or the possibility of installation in smaller engines are the fact that the sealing oil groove and thus its connection can be omitted if control oil pressure is used to pressurize the control chambers of the combustible-gas nozzle needles close to the nozzle. The application pressure must be greater than the combustible gas pressure so that it can serve the sealing oil function.

In order to achieve a uniform opening of the combustible-gas nozzle needles, it may be useful to allow the opening-pressure control chambers to also communicate in the region of the nozzle body by means of a flow connection. Communication between the opening-pressure control chambers can thus take place both in the region of the nozzle body and in the region of the connection or the 3/2 valve of the fuel injector. On the other hand, it can also be advantageous to run the control lines separately, preferably separated from one another as far as possible. This is because if a combustible-gas nozzle needle begins to open earlier due to tolerance variations, the combustible-gas nozzle needle movement of one nozzle needle reduces the excess pressure of the other combustible-gas nozzle needle. This is reduced by the strongest possible decoupling, for example by using long control lines.

The piston section on a respective combustible-gas nozzle valve element can be a correspondingly piston-shaped, in particular widened, section of the respective combustible-gas nozzle valve element, in particular an end section. Alternatively, the piston section can be formed, for example, by a piston element held on the combustible-gas nozzle valve element, e.g. by a pressed-on ring element.

By means of the respective piston control assemblies formed in this way—and in particular an embodiment of the combustible-gas nozzle valve elements having a negligibly small pressure stage exposed to the combustible gas pressure—it becomes possible to control the stroke of the respective combustible-gas nozzle valve element largely independently of a combustible gas pressure applied thereto, in particular axially displaceably. In this way, an advantageously fast stroke speed of the respective combustible-gas nozzle valve element can be achieved even with only low or almost nonexistent combustible gas pressures, i.e. through active hydraulic (forced) control by means of the piston control assemblies. In addition, by dimensioning the respective piston section surfaces, an intended stroke behavior can also be configured in a simple manner.

Furthermore, advantageously structurally uncomplicated and at the same time robust, the fuel injector is designed to control the stroke of the combustible-gas nozzle valve elements, in particular all of them, in tandem using a 3/2-way valve or 3/2-way pilot valve, in particular a single 3/2-way valve, wherein a hydraulic pressure in the closing control chamber of the piston control assemblies is controlled using the 3/2-way valve and a control or blocking oil pressure is permanently applied to the opening pressure control chamber. The 3/2-way valve is preferably designed generally as a slide valve.

In this case, the fuel injector is preferably designed to be able to effect or control a uniform hydraulic pressure level in the respective closing-pressure control chambers using the 3/2-way valve, e.g. a relief or load pressure level, while a uniform second hydraulic pressure level, for example a load or relief pressure level, is configured in the respective opening-pressure control chambers. In general, the pressure is controlled using the 3/2-way valve in such a way that—when using the fuel injector with a fuel injection device—the closing-pressure control chambers are uniformly relieved for an opening stroke of the combustible-gas nozzle valve elements (e.g. leakage pressure level, e.g. up to 10 bar), while the opening-pressure control chambers remain uniformly loaded (e.g. control fluid high-pressure level, e.g. 550 bar) for a closing stroke, the opening-pressure control chambers remain loaded accordingly and the closing-pressure control chambers are loaded. For this purpose, a high-pressure flow path (control fluid) from a high-pressure control fluid source can be routed to the 3/2-way valve, as well as a leakage flow path from the 3/2-way valve to the low-pressure side (leakage). The needle remains closed when the opening-pressure control chambers and the closing-pressure control chambers are loaded, since the force in the direction of the end closer to the nozzle is greater than the force in the direction of the end more remote from the nozzle due to the area ratios.

With this embodiment, it is advantageously possible to have a pressure switch act simultaneously on all combustible-gas nozzle valve elements. Controlling the stroke of the combustible-gas nozzle valve elements can take place largely independently of the combustible gas pressure, so that injection processes with a very low combustible gas pressure level are also possible. In addition, virtually any combustible gas pressure level can be configured, i.e. if the respective combustible-gas nozzle valve element—as proposed within the scope of the invention—does not have a pressure level which, in interaction with a combustible gas pressure, significantly influences the opening and closing behavior.

In the context of the invention, it is proposed in a further embodiment of the fuel injector that the closing-pressure control chambers are connected to one another in a communicating manner via a flow path (or a first flow channel), which in turn is connected to the 3/2-way valve to control the stroke of the combustible-gas nozzle valve elements in tandem. Such a flow path, which connects the closing-pressure control chambers in a communicating manner, is preferably formed by means of a number of channels, preferably forming a ring line. However, a connection of the closing-pressure control chambers via a flow path in the form of a star line is also conceivable.

In advantageous embodiments in which the closing-pressure control chambers are formed at an end of the nozzle body remote from the nozzle, such a flow connection, in particular a ring line, is preferably formed by means of a groove which is machined in the nozzle body, in particular into a surface thereof remote from the nozzle.

It is also preferred within the scope of the invention that the opening-pressure control chambers, in particular the control chambers closer to the nozzle, communicate with one another via a flow connection (or via a second flow channel). Such a flow connection is again preferably formed by means of a number of channels, in particular as a star line. Such a star line can be formed, for example, by means of (inclined) bores which, starting from a node, form branching channels to the respective opening-pressure control chambers. However, a ring line for connecting the opening-pressure control chambers is also conceivable.

Furthermore, advantageous embodiments of the invention are that the control chambers more remote from the nozzle and/or the control chambers closer to the nozzle are annular chambers. In such embodiments, the fuel injector for each combustible-gas nozzle valve element can have a closing element which is acted upon by a pretensioning force and which is pushed against the combustible-gas nozzle valve element remote from the nozzle, wherein in particular an annular control chamber or closing-pressure control chamber is formed, i.e. around the closing element. By means of the closing element, unintentional opening in the event of a fault can be avoided and an intended closing force can be configured in a simple manner.

A respective control chamber closer to the nozzle or opening-pressure control chamber—formed as an annular chamber—can also be formed around the combustible-gas nozzle valve element, which can continue in a rod-shaped manner starting from the piston section, i.e. towards the nozzle assembly.

In embodiments of the fuel injector that are advantageously structurally uncomplicated to provide, the piston control assemblies also have an end remote from the nozzle in a common (radial) plane, at which the closing-pressure control chambers are capped by means of an injector housing element. A respective closing element can also be received in the injector housing element, see above, which closing element, emerging from the injector housing element, can be pushed into contact at the end against a paired combustible-gas nozzle valve element received in the nozzle body. Such an injector housing element is, for example, an intermediate plate.

Such a configuration in which the piston control assemblies have an end remote from the nozzle in a common plane, at which the closing-pressure control chambers are capped by means of an injector housing element, can also be used to cap a control chamber of a liquid-fuel nozzle valve element of the fuel injector, i.e. when designed as a multi-fuel fuel injector.

It is also noteworthy within the scope of the invention that the proposed fuel injector is preferably designed to apply a hydraulic control fluid to the piston control assemblies, which control fluid is held permanently in the opening pressure control chambers specifically for combustible-gas nozzle valve element pressure control and is supplied to the closing-pressure control chambers using the 3/2-way valve. Combustible gas operation can thus take place independently of other media pressure levels at the fuel injector, for example independently of a liquid fuel injection pressure or system pressure. Because the actuation fluid (control fluid, e.g. control oil) and the injected medium (combustible gas, liquid fuel) are independent of one another, the fuel injector can be used extremely flexibly.

It should also be noted that the 3/2-way valve (or pilot valve) within the scope of the invention is preferably connected to the control chambers in such a way that in the inactive valve position or basic position—and use in combustible gas operation—a respective closing-pressure control chamber is always loaded.

The invention also proposes a fuel injection device which has at least one fuel injector as discussed above. Such a fuel injection device preferably has a separate control fluid supply device to control the stroke of the combustible-gas nozzle valve elements in tandem using a 3/2-way valve, so that in particular the aforementioned advantages of flexible use and independence from fuel pressure levels can be achieved.

Further features and advantages of the invention emerge from the following description of embodiments of the invention, with reference to the figures of the drawings, which show details essential to the invention, and from the claims. The individual features can each be implemented individually or collectively in various combinations in a variant of the invention.

Preferred embodiments of the invention are explained in more detail below with reference to the accompanying drawings. In the drawings.

In the following description and the drawings, the same reference signs correspond to elements with the same or comparable function.

Figure 1:
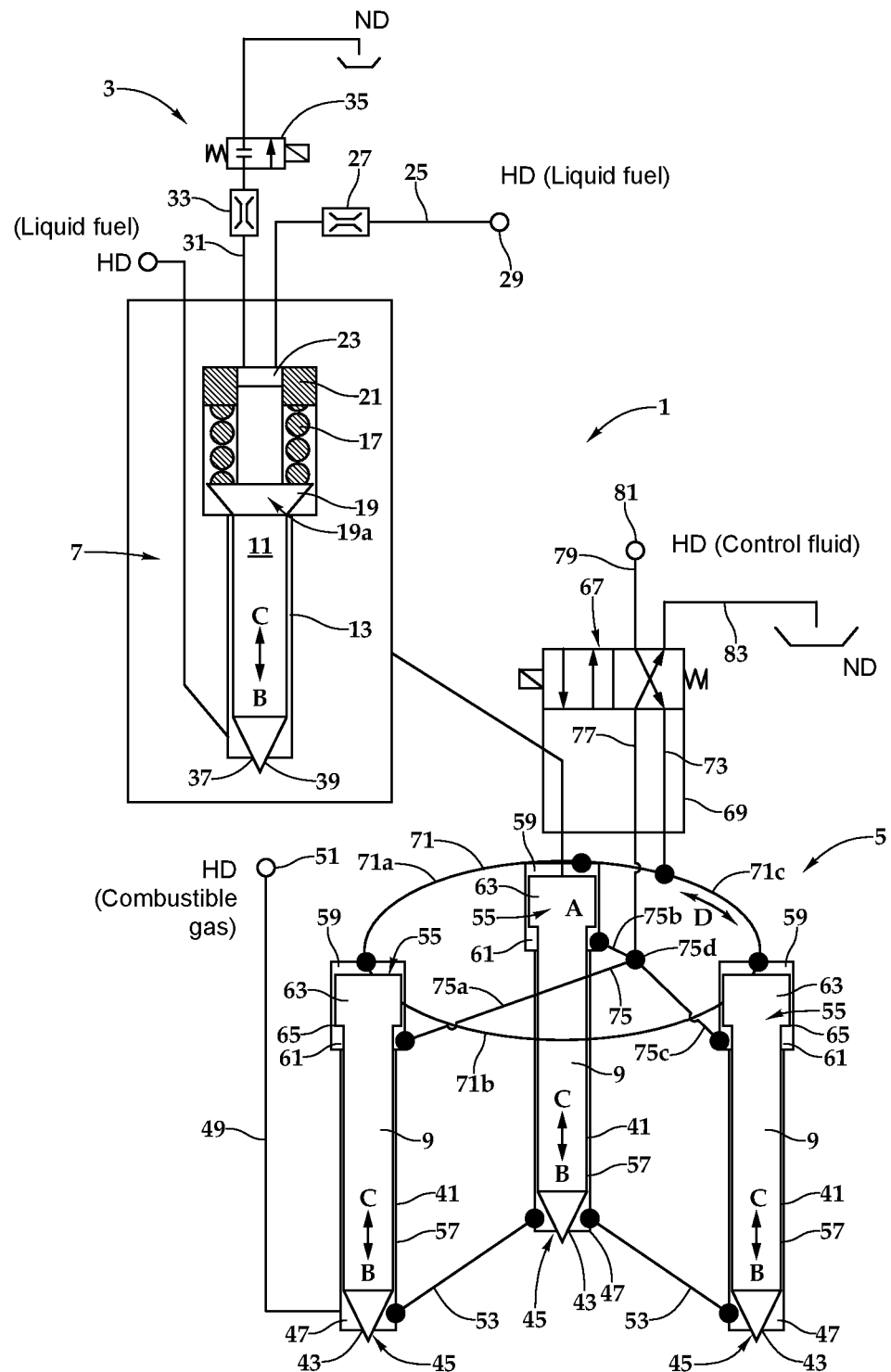
FIG. 1 is, by way of example and schematically, a structural diagram of the fuel injector according to one possible embodiment of the present invention.

FIG. 1 shows, by way of example and schematically, a fuel injector 1 for operating with combustible gas, e.g. methane (or also methanol), biogas, special gas, etc., wherein the fuel injector is provided as a dual-fuel fuel injector 1 and wherein a liquid fuel part 3 of the fuel injector 1—for the sake of clarity—is shown separated from a combustible gas part 5 of the fuel injector 1.

In the fuel injector 1, a liquid-fuel nozzle valve part 7 of the liquid fuel part 3 is provided for arrangement amidst a plurality of combustible-gas nozzle valve elements of the combustible gas part, represented by arrow A. Here, the liquid-fuel nozzle valve part 7 has a liquid-fuel nozzle valve element 11 in the form of a liquid-fuel nozzle needle, which is received in an axial bore 13 of a nozzle body 15 (not shown in FIG. 1) of the fuel injector 1. The liquid-fuel nozzle valve element 11 is pretensioned in a closing direction B, i.e. it is loaded by means of a closing spring 17 which is supported at one end against a collar 19 on the liquid-fuel nozzle valve element 11 and at the other end on a guide sleeve 21. By means of the guide sleeve 21—and an end section of the liquid-fuel nozzle valve element 11 guided therein—a control chamber 23 for the liquid-fuel nozzle valve element 11 is furthermore defined.

The control chamber 23 can be loaded via a (high-pressure) load flow path 25—having a throttle device 27 arranged therein—starting from a liquid fuel inlet 29 on the fuel injector 1, so that the liquid-fuel nozzle valve element 11 is pushed into the closed position. Via a (low-pressure)

relief flow path 31—having a throttle device 33 arranged therein—the control chamber 23 can be selectively relieved by means of a (2/2-way) pilot valve 35, i.e. in order to control the liquid-fuel nozzle valve element 11 in the open position (wherein said liquid-fuel nozzle valve element 11 lifts out of a valve seat 37 and liquid fuel can be discharged via a liquid-fuel nozzle assembly 39 arranged downstream), in the direction of arrow C. In order to control its stroke, the liquid-fuel nozzle valve element 11 has—in particular formed by annular shoulder 19—a pressure stage 19a that significantly influences stroke behavior, against which high-pressure-loaded liquid fuel introduced into the axial bore 13 can act and thus achieve a force in opening direction C.

As already mentioned above and further illustrated in FIG. 1, the fuel injector or its combustible gas part 5 has a plurality of combustible-gas nozzle valve elements 9, in this case in particular three combustible-gas nozzle valve elements 9, which are each provided in the form of combustible-gas nozzle needles. The combustible-gas nozzle valve elements 9 are dimensioned to be as short as possible, so that their mass to be moved is advantageously small. Each of the combustible-gas nozzle valve elements 9 is received in a paired axial receptacle 41, in particular an axial bore, in the nozzle body 15, i.e. axially displaceable in stroke, wherein the combustible-gas nozzle valve elements 9 are arranged around the centrally arranged liquid-fuel nozzle valve element. In the arrangement shown, the combustible-gas nozzle valve elements have an offset in the circumferential direction D of 120° to one another.

At a nozzle end of each combustible-gas nozzle valve element 9, this acts against a combustible-gas nozzle valve seat 43, i.e. upstream of a combustible-gas nozzle group 45 paired with a respective combustible-gas nozzle valve element 9, formed by means of one or more spray holes. With the fuel injector 1, combustible gas can be injected, for example, at a pressure level of approximately 350 bar to 550 bar (whereby a symmetrical spray pattern over 360° can be achieved as a result of the symmetrical offset of the combustible-gas nozzle valve elements 9). In order to be able to supply the combustible gas—when the combustible-gas nozzle valve elements 9 are lifted out of the respective seat 43—to the combustible-gas nozzle groups 45, combustible-gas nozzle chambers 47 on the respective combustible-gas nozzle valve elements 9 are connected in a communicating manner to a (high-pressure) combustible-gas supply line 49, starting from a combustible gas inlet 51 of the fuel injector 1, e.g. via branches 53.

It should be noted at this point that the combustible-gas nozzle valve elements 9, as also illustrated in FIG. 1, in the scope of the present invention preferably do not have such a pressure stage which significantly influences stroke behavior during combustible gas operation due to a combustible gas pressure acting against it.

For each of the combustible-gas nozzle valve elements 9, the fuel injector 1 has a hydraulic or hydraulically actuated piston control assembly 55, via which the stroke of the respective combustible-gas nozzle valve element 9 can be controlled, i.e., the stroke can be controlled hydraulically. The respective piston control assembly 55 is formed on an end section of a respective combustible-gas nozzle valve element 9 remote from the nozzle, i.e. adjacent to an end remote from the nozzle of a gap guide 57 for the respective combustible-gas nozzle valve element 9.

A respective piston control assembly 55 comprises two control chambers 59, 61 and a piston section 63 which separates the control chambers in such a way that their volumes can be varied on the combustible-gas nozzle valve element 9 paired with the piston control assembly 55. One of the two control chambers 59, 61 is in this case a control chamber more remote from the nozzle 59, which is provided to be able to exert a closing force on the paired combustible-gas nozzle valve element 9 (in the closing direction B), i.e. when the control chamber 59 is under hydraulic load. As such, the control chamber more remote from the nozzle in the present invention is also referred to as a closing-pressure control chamber 59. The further control chamber 61 is a control chamber 61 closer to the nozzle, which is provided to be able to exert a force in the opening direction C (opening pressure) on the respective combustible-gas nozzle valve element 9 when it is loaded. In this respect, the control chamber closer to the nozzle is also referred to as the opening-pressure control chamber 61 within the scope of the present invention.

The control chambers 59, 61 of a respective piston control assembly 55 are received in a housing 65 thereof, which can be formed by means of a cross-sectional widening of the axial bore 41 receiving the combustible-gas nozzle valve element 9. The respective housing 65 can advantageously be capped simply by means of an injector housing element (not shown in FIG. 1).

As FIG. 1 also shows, according to the invention, the fuel injector 1 is designed to control the stroke of the combustible-gas nozzle valve elements 9 in tandem, in particular also simultaneously, in particular using a single, 3/2-way valve 67 (or 3/2-way pilot valve 67), in particular also to control the combustible-gas nozzle valve elements 9 uniformly, i.e. uniformly in the open or closed position within the scope of stroke control in tandem. For this purpose, the 3/2-way valve 67 can be used to control hydraulic pressure in the closing-pressure control chambers 59 of the piston control assemblies 55, in particular in all of the closing-pressure control chambers 59, 61.

In this context, the fuel injector is able in particular to configure a first uniform hydraulic pressure level in the majority of the opening-pressure control chambers 61 and a second uniform hydraulic pressure level in the majority of the closing-pressure control chambers 59 using the 3/2-way valve 67, i.e. in a respective position of the 3/2-way valve 67. The fact that the combustible-gas nozzle valve elements 9 can be actuated in this way using a single 3/2-way valve 67 advantageously allows a space-saving design of the fuel injector 1. The 3/2-way valve 67 is preferably designed, for example, as a slide valve, which can be designed to be robust and reliable. The 3/2-way valve 67 can be arranged, for example, at an end of the fuel injector 1 remote from the nozzle, for example on an individual pressure accumulator 69 thereof, so that simple arrangement and accessibility is provided.

In order to be able to control all of the combustible-gas nozzle valve elements 9 uniformly in the respective control position using the 3/2-way valve 67, and yet in an uncomplicated manner, the closing-pressure control chambers 59 are connected to one another in a communicating manner via a flow path 17 which—via a branch 73—is connected to the 3/2-way valve 67 to control the combustible-gas nozzle valve elements 9 in tandem. The flow path 71 which in this case connects the closing-pressure control chambers 59, in particular with a resulting almost uniform pressure level, is preferably an annular channel 71, furthermore preferably formed by means of an annular groove in the surface of the nozzle body. This will be discussed in more detail below. The connection of the closing-pressure control chambers 59 to the annular channel 71 can, for example, be done via punctures.

As FIG. 1 further illustrates, the opening-pressure control chambers 61 which are permanently loaded with control fluid also preferably communicate with one another, i.e. via a flow connection 75. In order to connect the opening-pressure control chambers 61, a star line may be provided which brings the line branches 75a, b, c together at a node 75d of the opening pressure-control chambers 61. In order to establish the flow connection 75, inclined bores can be machined in the nozzle body 15 in a simple manner, i.e. for each line branch 75a, b, c. It can be noted here that, if necessary, an opening or closing time offset—considered across the combustible-gas nozzle valve elements 9—can be considered by a suitable selection of the line lengths of the line branches 75a, b, c.

In the fuel injector 1, the 3/2-way valve 67—for the purpose of controlling the stroke of the combustible-gas nozzle valve elements 9—is furthermore connected to a control fluid supply branch 79 (starting from a control fluid inlet 81 of the fuel injector 1) and a control fluid or leakage outflow branch 83 in such a way that in a first of two switching positions of the 3/2-way valve 67 (which is illustrated in FIG. 1), respective closing-pressure control chambers 59 are hydraulically loaded via the control fluid supply branch 79 and the downstream flow path, formed by means of the branch 73 and the flow path 71, while the opening-pressure control chambers 61 are consequently hydraulically loaded at a constant level. In this position, the respective combustible-gas nozzle valve element 9 is pushed into the closed position.

In the second of two switching positions of the 3/2-way valve 67, the respective opening-pressure control chambers 61 are hydraulically loaded at a constant level, while the closing-pressure control chambers 59 are consequently hydraulically relieved, i.e. by the outflow of control fluid from the closing-pressure control chambers 59 via the flow path 71 and the branch 73 and then the leakage outflow branch 83.

The fuel injector 1 is designed here in particular to switch the 3/2-way valve 67 in the rest position (not activated) to the position shown in FIG. 1, i.e. the opening-pressure control chambers 61 are all loaded, the closing-stroke control rooms 59 are all loaded. The 3/2-way valve 67 (activated) can preferably be switched over by means of a magnetic actuator with a return spring.

With the fuel injector 1 configured in this way, it is also provided in particular that the control fluid for controlling the plurality of combustible-gas nozzle valve elements 9 is supplied to the control chambers 59, 61 via a separate control fluid source of a fuel injection device, so that stroke control is made possible which—in the embodiment with the most negligible pressure stage at the combustible-gas nozzle valve elements 9—is largely unaffected by the combustible gas pressure but also other media pressure levels such as the system pressure of the liquid fuel part 3. This means that the liquid fuel part 3 is hydraulically decoupled, in particular from the combustible gas part 5 (see also FIG. 1). It should also be noted that in the embodiment according to FIG. 1, the respective closing-pressure control chambers 59 are, for example, cylindrical, while the respective opening-pressure control chambers 61, formed around a rod-shaped section of the respective combustible-gas nozzle valve member 9, are provided as annular chambers.

Figure 2:
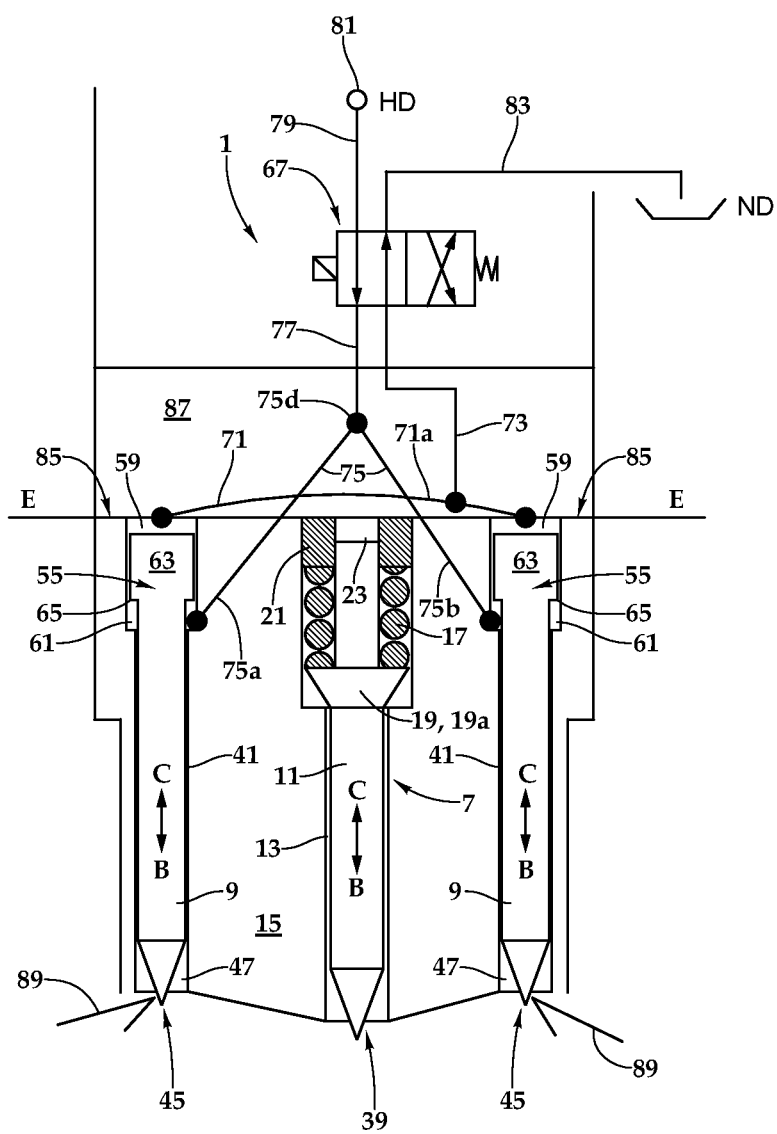
FIG. 2 is, by way of example and schematically, a diagram focused on the arrangement of nozzle valve elements in a nozzle body of the fuel injector according to one possible embodiment of the invention.

FIG. 2 is a view of a fuel injector 1 according to the invention, in particular a dual-fuel fuel injector, in which two combustible-gas nozzle valve elements 9 and the central liquid-fuel nozzle valve element 11 are shown received in a nozzle body 15, wherein the combustible-gas nozzle valve elements 9 are shown controlled in particular—via the 3/2-way valve 67—in the open position (combustible gas operation). Flow paths of the liquid fuel part 3 and a combustible gas flow path 49 are not shown here.

As illustrated in FIG. 2, a respective closing-pressure control chamber 59 or the housing 65 of a respective piston control assembly 55 can be formed by means of a cross-sectional widening of the axial receptacle 41, which can be machined into the nozzle body 15 in a simple manner starting from a surface 85 of the nozzle body 15 remote from the nozzle, i.e. as a stepped bore. As can be seen, the axial bore 13 of the liquid-fuel nozzle valve element 11 together with the control chamber 23 formed therein is preferably formed on the same surface 85 of the nozzle body, whereby with this arrangement, in which the ends of the control chambers 59, 23 remote from the nozzle each rest in a common (radial) plane E, all closing-pressure control chambers 59 as well as the control chamber 23 of the liquid-fuel nozzle valve element 11 with a planar element, in particular an injector housing element, preferably an intermediate disk or plate 87, can also be covered in an uncomplicated manner.

In the open position shown, combustible gas can be discharged via the combustible-gas nozzle openings of the combustible-gas nozzle groups 45, preferably with the directional component of the combustible gas jets 89 pointing radially outward.

Figure 3:
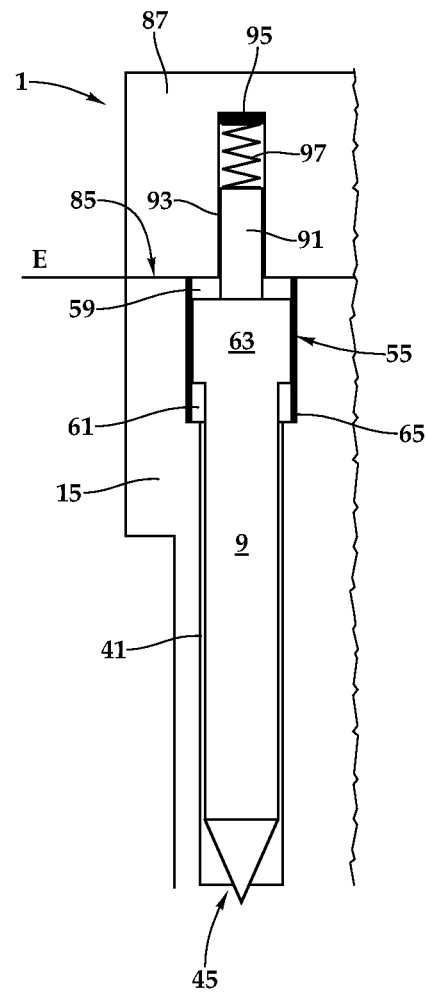
FIG. 3 is, by way of example and schematically, a broken view of a further possible embodiment of a fuel injector according to the invention, showing a combustible-gas nozzle valve element loaded by a closing element.

FIG. 3 is a broken view of the fuel injector 1 focused on a combustible-gas nozzle valve element 9 (representative of the plurality of combustible-gas nozzle valve elements 9) according to a further preferred embodiment of the invention, whereby both the closing-stroke control chamber 59 and the opening-pressure control chamber 61 are each formed as an annular chamber.

In the embodiment shown in FIG. 3, a respective combustible-gas nozzle valve element 9 is loaded in the closing direction B by a closing element 91 which is resiliently biased in the closing direction B. The closing element 91 is arranged in a receptacle 93 which is formed by means of a bore (wherein the bore is oriented coaxially with the axial bore 41 of the combustible-gas nozzle valve element 9). The receptacle 93 is formed, for example, in an injector housing element such as an intermediate plate 87, preferably covering the respective closing-pressure control chambers 59 (as discussed, for example, with reference to FIG. 2).

In the receptacle 93—at the end and remote from the nozzle—an adjusting element 95 is also arranged, which serves to adjust the spring force of a compression spring 97 acting on the closing element 91, and consequently the combustible-gas nozzle valve element 9. The adjusting element 95 can be a simple disk, wherein the spring force is adjustable as a function of the thickness of the disk arranged in the receptacle 93. This makes it possible to reduce any undesired time delay during a stroke process—considered across the majority of the combustible-gas nozzle valve elements 9—by means of the adjusting element 95, by means of a targeted change in the spring force acting on a combustible-gas nozzle valve element 9.

Figure 4:
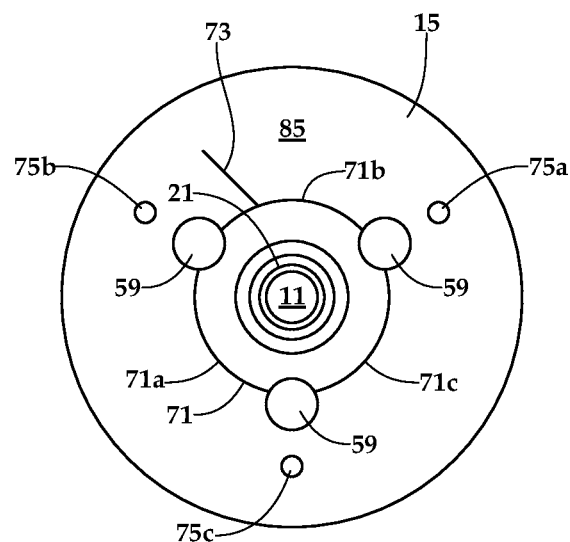
FIG. 4 is, by way of example and schematically, a plan view of a nozzle body of a fuel injector according to the invention.

FIG. 4 is, by way of example and schematically, a plan view of an end of a nozzle body 15 remote from the nozzle of a fuel injector 1 according to the invention, wherein a flow path 71 in the form of a ring line is illustrated, which—formed by means of an annular groove—connects the closing-pressure control chambers 59 in a communicating manner, i.e. via channel sections 71a, b, c. The inclined bores for producing the star line in the context of the flow connection 75 of the opening-pressure control chambers 61 are made in sections therein, starting from the end of the nozzle body 15 remote from the nozzle. A portion of the branch 73 for connecting the ring line to the 3/2-way valve 67 is also illustrated. As can be seen, the liquid-fuel nozzle valve element 11 together with the guide sleeve 21 is arranged centrally. In addition to simple assembly, this results in extremely compact injector dimensions.

The invention claimed is:

1. A fuel injector for combustible gas, the fuel injector comprising:
 a plurality of combustible-gas nozzle valve elements, each comprising:
  a piston section; and
  a hydraulic piston control assembly comprising a pair of control chambers comprising an opening-pressure control chamber and a closing-pressure control chamber separated by the piston section such that the volumes of the opening-pressure control chamber and the closing-pressure control chamber are variable, wherein the combustible-gas nozzle valve element has a stroke controlled by the hydraulic piston control assembly; and
 a 3/2-way valve configured to control pressures in at least one of the opening-pressure control chamber and the closing-pressure control chamber of each of the plurality of combustible-gas nozzle valve elements, wherein the 3/2-way valve is configured to fluidly connect the opening-pressure control chamber to a control fluid source and fluidly connect the closing-pressure control chamber to a fluid outflow in a first configuration, and is configured to fluidly connect the opening-pressure control chamber to the fluid outflow and fluidly connect the closing-pressure control chamber to the control fluid source in a second configuration.

2. The fuel injector of claim 1, wherein:
 the closing-pressure control chamber is configured such that a closing force is exerted on the respective paired combustible-gas nozzle valve element when under a hydraulic load, and
 the opening-pressure control chamber is configured to exert an opening force on the respective paired combustible-gas nozzle valve element when under hydraulic load; and
 the fuel injector is configured to provide a first uniform hydraulic pressure level in a plurality of the opening-pressure control chambers and to control a second uniform hydraulic pressure level in a plurality of the closing-pressure control chambers using the 3/2-way valve.

3. The fuel injector of claim 2, wherein a first opening-pressure control chamber is connected to a second opening-pressure control chamber in a communicating manner by a flow path, or a first closing-pressure control chamber is configured communicate with a second closing-pressure control chamber by a flow connection which is connected in a communicating manner to the 3/2-way valve and configured to control the stroke of one or more of the combustible-gas nozzle valve elements in tandem.

4. The fuel injector of claim 3, wherein the flow path forms a ring line or a star line configured to provide fluidic communication between the first closing-pressure control chamber and the second closing-pressure control chamber, or the flow connection forms a star line or a ring line configured to provide fluidic communication between the first opening-pressure control chamber and the second opening-pressure control chamber.

5. The fuel injector of claim 4, wherein the ring line is defined by an annular groove defined in a surface remote from the nozzle of a nozzle body of the fuel injector that receives the combustible-gas nozzle valve element.

6. The fuel injector of claim 3, wherein the 3/2-way valve is configured to generate the first uniform hydraulic pressure level by providing hydraulic control fluid to the first closing-pressure control chamber, and generate the second uniform hydraulic pressure level by providing hydraulic control fluid to the second closing-pressure control chambers.

7. The fuel injector of claim of 2, wherein one or both of the closing-pressure control chamber or opening-pressure control chamber is an annular chamber.

8. The fuel injector of claim 2, wherein one or more of the piston control assemblies comprise an end remote from the combustible-gas nozzle valve element in a common plane and wherein the closing-pressure control chambers are capped by an injector housing element.

9. The fuel injector of claim 8, wherein the injector housing element also caps a control chamber of a liquid-fuel nozzle valve element of the fuel injector in the common plane.

10. The fuel injector of claim 1, wherein the combustible-gas nozzle valve element has a closing element configured to be acted upon by a pre-tensioning force, and is configured to be urged against the combustible-gas nozzle valve element remote from the nozzle such that an annular closing-pressure control chamber is formed.

11. The fuel injector of claim 1, wherein the 3/2-way valve is a slide valve.

12. The fuel injector of claim 1, wherein the plurality of combustible-gas nozzle valve elements is arranged in an evenly distributed circumferential arrangement about a circumference of the fuel injector.

13. The fuel injector of claim 1, wherein the fuel injector is a dual-fuel injector.

14. The fuel injector of claim 1, wherein a plurality of combustible-gas nozzle valve elements is arranged around a liquid-fuel nozzle valve element.

15. The fuel injector of claim 1, wherein the fuel injector comprises a plurality of the 3/2-way valves, a plurality of the combustible-gas nozzle valve elements, and a separate control fluid supply device to control the strokes of a plurality of the combustible-gas nozzle valve elements in tandem using the plurality of the 3/2-way valves.

16. An internal combustion engine comprising:
 a plurality of fuel injectors for combustible gas, each of the fuel injectors comprising:
  a piston section; and
  a hydraulic piston control assembly comprising a pair of control chambers comprising an opening-pressure control chamber and a closing-pressure control chamber separated by the piston section such that the volumes of the opening-pressure control chamber and the closing-pressure control chamber are variable, wherein the piston section has a stoke controlled by the hydraulic piston control assembly; and
 a 3/2-way valve configured to control pressure in at least one of the opening-pressure control chamber and the closing-pressure control chamber, wherein the 3/2 way valve is configured to fluidly connect the opening-pressure control chamber to a control fluid source and fluidly connect the closing-pressure control chamber to a fluid outflow in a first configuration, and is configured to fluidly connect the opening-pressure control chamber to the fluid outflow and fluidly connect the closing-pressure control chamber to the control fluid source in a second configuration.

\* \* \* \* \*

UNITED STATES PATENT AND TRADEMARK OFFICE
CERTIFICATE OF CORRECTION

PATENT NO. : 11,767,815 B2
APPLICATION NO. : 17/310201
DATED : September 26, 2023
INVENTOR(S) : Ingmar Joachim Berger et al.

Page 1 of 1

It is certified that error appears in the above-identified patent and that said Letters Patent is hereby corrected as shown below:

On the Title Page

Item (71), Column 1, Line 1, please delete "GmbH" and insert -- GmbH, Stuttgart --.

In the Specification

In Column 1, Lines 14-15, please delete "by a suitable selection of the line lengths of the line branches 75a, b, c." and insert the same on Column 9, Line 13 as continuation of the same paragraph.

In the Claims

In Column 11, Line 55, in Claim 3, please delete "configured" and insert -- configured to --.

In Column 12, Line 11, in Claim 7, please delete "claim of" and insert -- claim --.

In Column 12, Line 58, in Claim 16, please delete "stoke" and insert -- stroke --.

In Column 12, Line 62, in Claim 16, please delete "3/2 way" and insert -- 3/2-way --.

Signed and Sealed this
Twenty-eighth Day of November, 2023

Katherine Kelly Vidal
*Director of the United States Patent and Trademark Office*